United States Patent
Dang (10) Patent No.: US 11,829,690 B2
(45) Date of Patent: Nov. 28, 2023

(54) RADIATION RISK ASSESSMENT METHOD AND DEVICE, ELECTRONIC DEVICE AND STORAGE MEDIUM

(71) Applicant: Guangdong Inspur Smart Computing Technology Co., Ltd., Guangzhou (CN)

(72) Inventor: Jie Dang, Guangzhou (CN)

(73) Assignee: Guangdong Inspur Smart Computing Technology Co., Ltd., Guangzhou (CN)

(*) Notice: Subject to any disclaimer, the term of this patent is extended or adjusted under 35 U.S.C. 154(b) by 176 days.

(21) Appl. No.: 17/615,531

(22) PCT Filed: Oct. 31, 2019

(86) PCT No.: PCT/CN2019/114536
§ 371 (c)(1),
(2) Date: Nov. 30, 2021

(87) PCT Pub. No.: WO2021/031349
PCT Pub. Date: Feb. 25, 2021

(65) Prior Publication Data
US 2022/0318453 A1 Oct. 6, 2022

(30) Foreign Application Priority Data
Aug. 16, 2019 (CN) .......................... 201910760802.5

(51) Int. Cl.
*G06F 30/20* (2020.01)
(52) U.S. Cl.
CPC .................................. *G06F 30/20* (2020.01)
(58) Field of Classification Search
CPC ...................................................... G06F 30/20
See application file for complete search history.

(56) References Cited

U.S. PATENT DOCUMENTS

| 2002/0147553 A1* | 10/2002 | Shimazaki | G01R 31/2855 |
| | | | 702/65 |
| 2005/0258842 A1* | 11/2005 | Maloney | G01R 31/002 |
| | | | 324/750.26 |
| 2007/0124008 A1 | 5/2007 | Imaizumi | |

FOREIGN PATENT DOCUMENTS

| CN | 1975744 A | 6/2007 |
| CN | 105808800 A | 7/2016 |

(Continued)

OTHER PUBLICATIONS

Zvolsky M. Simulation, image reconstruction and SiPM characterisation for a novel endoscopic positron emission tomography detector. Deutsches Elektronen-Synchrotron (DESY); 2017. (Year: 2017).*

(Continued)

*Primary Examiner* — Chuen-Meei Gan
(74) *Attorney, Agent, or Firm* — David R. Stevens; Stevens Law Group (57) ABSTRACT

A radiation risk assessment method and device, an electronic device and a storage medium are provided. The method comprises: determining a risk signal to be assessed based on a product design model, and judging whether the risk signal to be assessed is periodic; if the risk signal to be assessed is periodic, determining the spectrum amplitude corresponding to the risk signal to be assessed; acquiring the current intensity of a radiation source and the distance between the risk signal to be assessed and the radiation source; calculating to obtain the radiation intensity of the risk signal to be assessed using the spectrum amplitude, the current intensity and the distance; and determining the corresponding radiation risk assessment result according to the radiation intensity.

12 Claims, 5 Drawing Sheets

(56) References Cited

FOREIGN PATENT DOCUMENTS

| | | |
|---|---|---|
| CN | 106547992 A | 3/2017 |
| CN | 106932672 A | 7/2017 |
| JP | H1144530 A | 2/1999 |

OTHER PUBLICATIONS

International Search Report, PCT/CN2019/114536, dated Apr. 26, 2020.
Written Opinion of the International Searching Authority, PCT/CN2019/114536, dated Apr. 26, 2020

* cited by examiner

RADIATION RISK ASSESSMENT METHOD AND DEVICE, ELECTRONIC DEVICE AND STORAGE MEDIUM

The present application claims the priority of Chinese patent application filed with the China Patent Office on Aug. 16, 2019, with the application number of 201910760802.5 and entitled "Radiation Risk Assessment Method and Device, Electronic Device and Storage Medium", the contents of which are incorporated herein by reference in its entirety.

TECHNICAL FIELD

The present application relates to the technical field of computers, in particular to a radiation risk assessment method and device, an electronic device and a computer readable storage medium.

BACKGROUND

EMC (Electro Magnetic Compatibility) test refers to an ability of a device or a system to operate compliantly in its electromagnetic environment and to produce no intolerable electromagnetic interference to any equipment in its environment. EMC design and EMC test are supplemented with each other, and the quality of EMC design needs to be measured by the EMC test.

A radiation test in the EMC test is generally performed in the later stage of product production, when problems of a higher radiation risk and other non-compliant problems are found after the product is finalized or production is completed, manpower and material resources need to be spent in modifying the design or in adopting remedial measures. In addition, in the existing radiation test, only qualitative assessment of risk is achieved, therefore, how to achieve quantitative assessment of risk and reduce the waste of manpower and material resources is a problem to be solved by those skilled in the art.

SUMMARY OF THE INVENTION

The objective of the present application is to provide a radiation risk assessment method and device and an electronic device and a computer readable storage medium, to achieve quantitative assessment of radiation risk, thereby effectively reducing the cost of manpower and material resources spent on later rectification of products.

To achieve the above objective, the present application provides a radiation risk assessment method, including:
determining a risk signal to be assessed based on a product design model, and judging whether the risk signal to be assessed is periodic;
if the risk signal to be assessed is periodic, determining the spectrum amplitude corresponding to the risk signal to be assessed;
acquiring the current intensity of a radiation source and the distance between the risk signal to be assessed and the radiation source;
calculating to obtain the radiation intensity of the risk signal to be assessed using the spectrum amplitude, the current intensity and the distance; and
determining the corresponding radiation risk assessment result according to the radiation intensity.

Optionally, the calculating to obtain the radiation intensity of the risk signal to be assessed using the spectrum amplitude, the current intensity and the distance includes:
calculating to obtain the radiation intensity of the risk signal to be assessed using the spectrum amplitude, the current intensity and the distance based on a first formula; wherein the first formula is as follows:

$$S = 20 \log_{10} \frac{|C_n| * I}{R};$$

wherein S is the radiation intensity; $C_n$ is the spectrum amplitude; I is the current intensity; and R is the distance.

Optionally, the determining the spectrum amplitude corresponding to the risk signal to be assessed includes:
acquiring the signal duty cycle, the signal period and the signal frequency of the risk signal to be assessed;
determining the spectrum amplitude of the risk signal to be assessed using a second formula, the signal duty cycle, the signal period and the signal frequency; wherein the second formula is as follows:

$$|c_n| = \frac{A\tau}{T} \left| \frac{\sin(n\pi f \tau)}{n\pi f \tau} \right|;$$

wherein $c_n$ is the spectrum amplitude; A is the voltage peak in the time domain of the risk signal; n is the number of harmonics; $\tau$ is the signal duty cycle; T is the signal period; and f is the signal frequency.

Optionally, the acquiring the signal duty cycle, the signal period and the signal frequency of the risk signal to be assessed includes:
acquiring the signal duty cycle, the signal period and the signal frequency corresponding to the risk signal to be assessed by querying a preset parameter library.

Optionally, the determining the corresponding radiation risk assessment result according to the radiation intensity includes:
acquiring a preset standard intensity and comparing to obtain a comparison result between the preset standard intensity and the radiation intensity; and
determining the corresponding radiation risk assessment result using the comparison result.

Optionally, the radiation risk assessment method further includes:
generating simulation results of an excitation waveform corresponding to the risk signal to be assessed based on an MATLAB tool;
correspondingly, the determining the corresponding radiation risk assessment result according to the radiation intensity comprises:
acquiring a preset standard intensity and comparing to obtain a comparison result between the preset standard intensity and the radiation intensity; and
determining the radiation risk assessment result using the comparison result and the simulation result.

To achieve the above objective, the present application provides a radiation risk assessment device, including:
a signal judgment module, configured to determine a risk signal to be assessed based on a product design model, and judge whether the risk signal to be assessed is periodic;

an amplitude determination module, configured to determine the spectrum amplitude corresponding to the risk signal to be assessed if the risk signal to be assessed is periodic;

a parameter acquisition module, configured to acquire the current intensity of the radiation source and the distance between the risk signal to be assessed and the radiation source;

an intensity calculation module, configured to calculate to obtain the radiation intensity of the risk signal to be assessed using the spectrum amplitude, the current intensity and the distance; and a result determination module, configured to determine the corresponding radiation risk assessment result according to the radiation intensity.

Optionally, the radiation risk assessment device further includes:

a simulation generation module configured to generate simulation results of an excitation waveform corresponding to the risk signal to be assessed based on an MATLAB tool;

correspondingly, the result determination module includes:

a comparison unit, configured to acquire a preset standard intensity and compare to obtain a comparison result between the preset standard intensity and the radiation intensity; and a determination unit, configured to determine the radiation risk assessment result using the comparison result and the simulation result.

To achieve the above objective, the present application provides an electronic device, including:

a memory, configured to store a computer program; and a processor, configured to implement the steps of any radiation risk assessment method disclosed above when executing the computer program.

To achieve the above objective, the present application provides a computer readable storage medium, the computer readable storage medium has a computer program stored thereon, and the computer program implements the steps of a radiation risk assessment method disclosed above when being executed by a processor.

It can be known from the above solution that, the radiation risk assessment method provided in the present application includes: determining a risk signal to be assessed based on a product design model, and judging whether the risk signal to be assessed is periodic; if the risk signal to be assessed is periodic, determining the spectrum amplitude corresponding to the risk signal to be assessed; acquiring the current intensity of a radiation source and the distance between the risk signal to be assessed and the radiation source; calculating to obtain the radiation intensity of the risk signal to be assessed using the spectrum amplitude, the current intensity and the distance; and determining the corresponding radiation risk assessment result according to the radiation intensity. It can be known from the above that, the present application uses the current intensity of the radiation source and the distance between the risk signal to be assessed and the radiation source to calculate to obtain the radiation intensity of the risk signal to be assessed, thereby achieving quantitative assessment of radiation risk; moreover, the present application determines the risk signal to be assessed based on the product design model, and can further analyze the risk signal to be assessed to obtain the corresponding radiation risk assessment results, and radiation test can be performed without waiting until the later stage of product production, thereby avoiding the process of rectification after product finalization or production completion due to the large radiation risk, and effectively reducing the manpower and material costs.

The present application further discloses a radiation risk assessment device and an electronic device and a computer readable storage medium, which can also achieve the above technical effects.

BRIEF DESCRIPTION OF THE DRAWINGS

In order to more clearly illustrate the technical solutions in the embodiments of the present application or the prior art, the accompanying drawings to be used in the description of the embodiments or the prior art will be briefly introduced below, apparently, the accompanying drawings in the following description are merely embodiments of the present application, and other drawings can be obtained from the these drawings without any creative effort by those skilled in the art.

DETAILED DESCRIPTION OF THE EMBODIMENTS

The technical solutions in the embodiment of the present application will be clearly and completely described below in combination with accompanying drawings in the embodiments of the present application, obviously, the described embodiments are merely a part but not all of the embodiments of the present application. Based on the embodiments in the present application, all the other embodiments obtained by those skilled in the art without any creative labor shall all fall within the protection scope of the present application.

In the prior art, a radiation test in the EMC test is generally performed in the later stage of product production, when problems of a higher radiation risk and other non-compliant problems are found after the product is finalized or production is completed, manpower and material resources need to be spent in modifying the design or in adopting remedial measures. In addition, in the existing radiation test, only qualitative assessment of risk is achieved Therefore, the embodiments of the present application disclose a radiation risk assessment method, achieving quantitative assessment of radiation risk, and effectively reducing the cost of manpower and material resources spent on later rectification of products.

Figure 1:
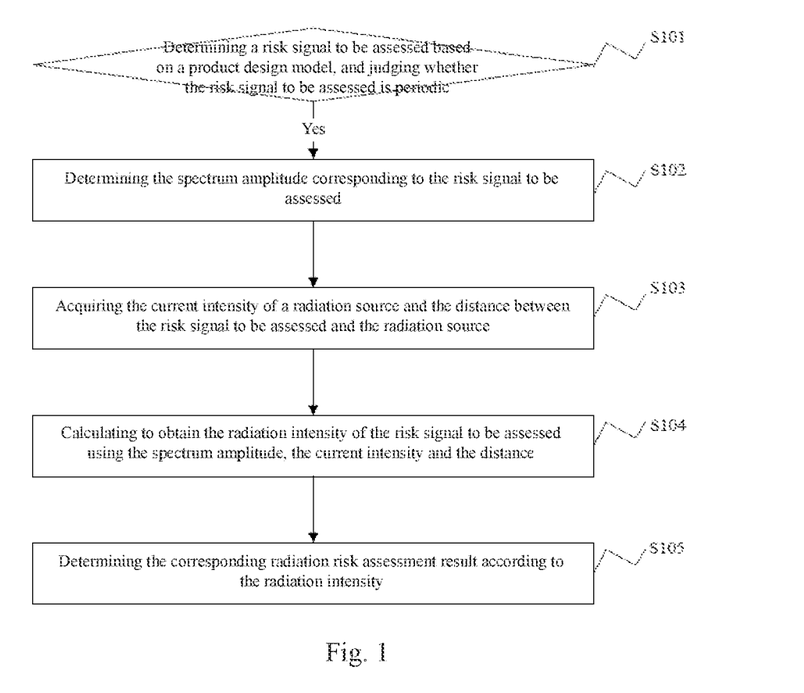
FIG. 1 is a flow chart of a radiation risk assessment method disclosed in the embodiment of the present application.

Please refer to FIG. 1 which is a flow chart of a radiation risk assessment method disclosed in the embodiment of the present application, as shown in FIG. 1, the radiation risk assessment method includes:

S101: determining a risk signal to be assessed based on a product design model, and judging whether the risk signal to be assessed is periodic; if the risk signal to be assessed is periodic, then entering S102.

In the present embodiment, the product design model is acquired and the risk signal to be assessed is determined, wherein the product design model can be specifically a product design drawing and the risk signal to be assessed refers to a signal for which the radiation risk needs to be assessed, e.g., a USB signal. It should be noted that, in the present embodiment, after the risk signal to be assessed is determined, whether the signal is periodic needs to be judged, and if the signal is periodic, then the workflow of step S102 is initiated.

S102: determining the spectrum amplitude corresponding to the risk signal to be assessed;

In this step, the spectrum amplitude corresponding to the risk signal to be assessed needs to be determined. First, the signal duty cycle, signal period and signal frequency of the risk signal to be assessed are acquired, and the spectrum amplitude of the risk signal to be assessed is determined according to the above parameters. Specifically, the spectrum amplitude can be calculated using a second formula according to the above parameters. Wherein, the second formula may be:

$$|c_n| = \frac{A\tau}{T}\left|\frac{\sin(n\pi f\tau)}{n\pi f\tau}\right|;$$

In the second formula, $c_n$ is the spectrum amplitude; A is the voltage peak in the time domain of the risk signal; n is the number of harmonics; $\tau$ is the signal duty cycle; T is the signal period; and f is the signal frequency.

During specific implementation, the above process of acquiring the signal duty cycle, signal period and signal frequency of the corresponding risk signal to be assessed may be as follows: acquiring the signal duty cycle, signal period and signal frequency of the corresponding risk signal to be assessed through searching for a preset parameter library. It can be understood that, the preset parameter library in the present embodiment may be a database established in advance according to signals and parameters corresponding to signals.

S103: acquiring the current intensity of a radiation source and the distance between the risk signal to be assessed and the radiation source.

In this step, the current intensity of a radiation source and the distance between the risk signal to be assessed and the radiation source can be determined based on the product design model.

S104: calculating to obtain the radiation intensity of the risk signal to be assessed using the spectrum amplitude, the current intensity and the distance.

It can be understood that, in the present embodiment, the spectrum amplitude, the current intensity and the distance between the risk signal to be assessed and the radiation source can be imported into the first formula, to calculate to obtain the radiation intensity of the risk signal to be assessed; wherein, the above first formula can be specified as follows:

$$S = 20 \log_{10}\frac{|C_n|*I}{R};$$

In the first formula, S is the radiation intensity, $C_n$ is the spectrum amplitude; I is the current intensity; and R is the distance between the risk signal to be assessed and the radiation source.

S105: determining the corresponding radiation risk assessment result according to the radiation intensity.

It can be understood that, after calculating the radiation intensity of the risk signal to be assessed, the radiation risk assessment result of the risk signal to be assessed can be determined according to the radiation intensity. Specifically, a plurality of radiation intensity values may be preset, and a corresponding radiation risk level may be set for each radiation intensity value, so that after calculating to obtain the current radiation intensity of the risk signal to be assessed, the current radiation intensity value may be compared with the preset radiation intensity value, to obtain the radiation risk level corresponding to the current radiation intensity. During specific implementation, the process of determining the corresponding radiation risk assessment results according to the radiation intensity may not be limited to the above-mentioned implementation, and the present embodiment is not limited herein.

It can be known from the above solution that, the radiation risk assessment method provided in the present application includes: determining a risk signal to be assessed based on a product design model, and judging whether the risk signal to be assessed is periodic; if the risk signal to be assessed is periodic, determining the spectrum amplitude corresponding to the risk signal to be assessed; acquiring the current intensity of a radiation source and the distance between the risk signal to be assessed and the radiation source; calculating to obtain the radiation intensity of the risk signal to be assessed using the spectrum amplitude, the current intensity and the distance; and determining the corresponding radiation risk assessment result according to the radiation intensity. It can be known from the above that, the present application uses the current intensity of the radiation source and the distance between the risk signal to be assessed and the radiation source to calculate to obtain the radiation intensity of the risk signal to be assessed, thereby achieving quantitative assessment of radiation risk; moreover, the present application determines the risk signal to be assessed based on the product design model, and can further analyze the risk signal to be assessed to obtain the corresponding radiation risk assessment results, and radiation test can be performed without waiting until the later stage of product production, thereby avoiding the process of rectification after product finalization or production completion due to the large radiation risk, and effectively reducing the manpower and material costs.

Figure 2:
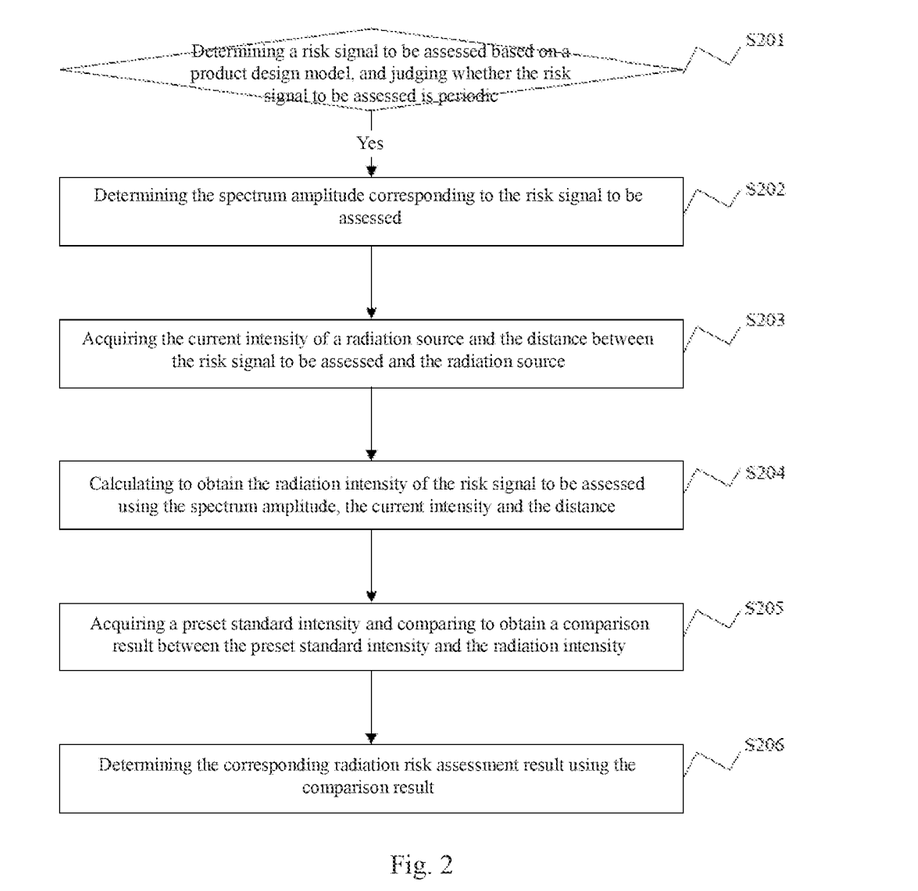
FIG. 2 is a flow chart of another radiation risk assessment method disclosed in the embodiment of the present application.

Embodiments of the present application provide another radiation risk assessment method, compared with the above embodiment, in the present embodiment, the technical solutions are further illustrated and optimized. Specifically:

Please refer to FIG. 2 which is a flow chart of another radiation risk assessment method provided in the embodiment of the present application, as shown in FIG. 2, the radiation risk assessment method includes:

S201: determining a risk signal to be assessed based on a product design model, and judging whether the risk signal to be assessed is periodic; if the risk signal to be assessed is periodic, then entering S202;

S202: determining the spectrum amplitude corresponding to the risk signal to be assessed;

S203: acquiring the current intensity of a radiation source and the distance between the risk signal to be assessed and the radiation source;

S204: calculating to obtain the radiation intensity of the risk signal to be assessed using the spectrum amplitude, the current intensity and the distance;

S205: acquiring a preset standard intensity and comparing to obtain a comparison result between the preset standard intensity and the radiation intensity;

S206: determining the corresponding radiation risk assessment result using the comparison result.

In the present embodiment, standard intensity of radiation is preset. After calculating to obtain the current radiation intensity of the risk signal to be assessed, whether a radiation risk exists is judged through comparing whether the current radiation intensity value is greater than the preset radiation intensity value. Wherein the preset standard strength can be set automatically through a system, and an intensity value set manually can also be acquired through a preset interface, during implementation, the intensity value can also be modified through a preset interface, and the numerical value can be set according to actual conditions during specific implementation.

Figure 3:
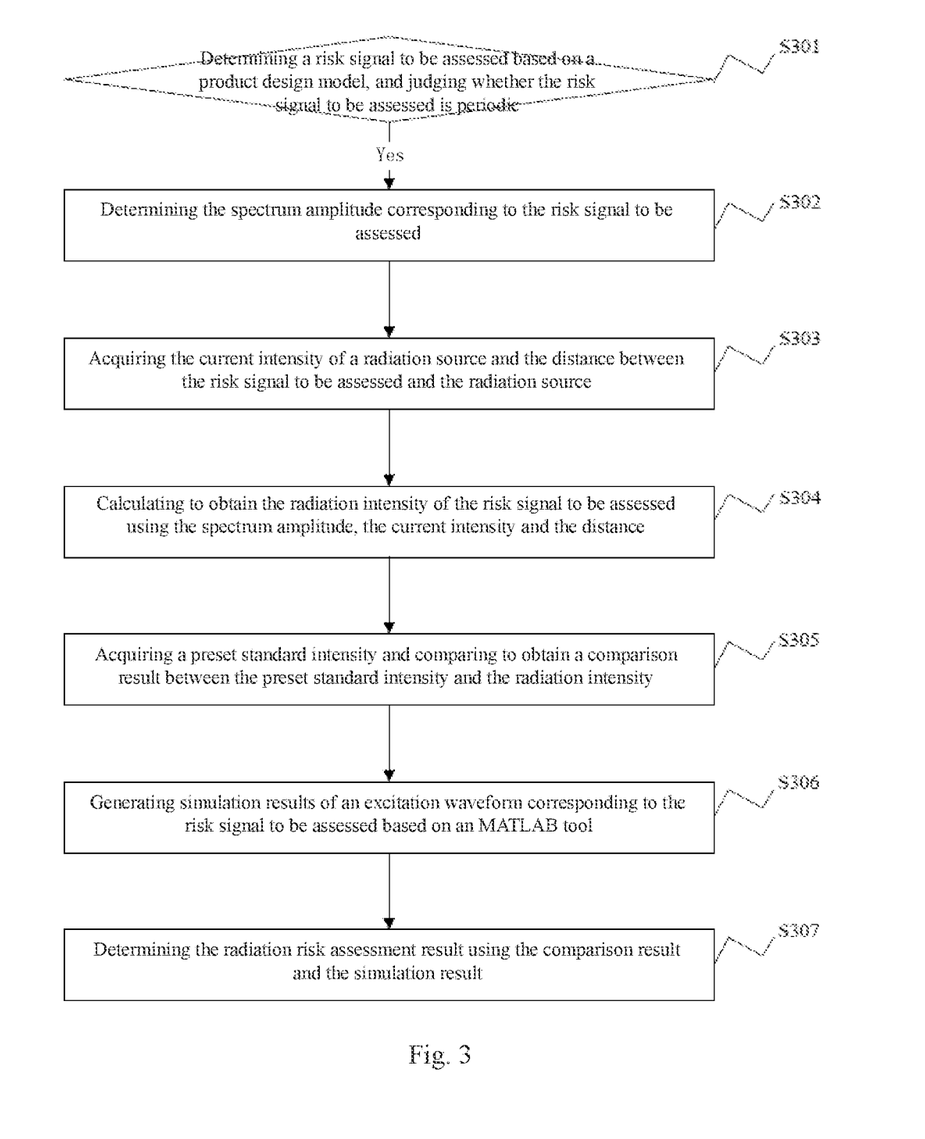
FIG. 3 is a flow chart of still another radiation risk assessment method disclosed in the embodiment of the present application.

Embodiments of the present application provide still another radiation risk assessment method, compared with the above embodiment, in the present embodiment, the technical solutions are further illustrated and optimized. Specifically:

Please refer to FIG. 3 which is a flow Chart of another radiation risk assessment method provided in the embodiment of the present application, as shown in FIG. 3, the method, includes:

S301: determining a risk signal to be assessed based on a product design model, and judging whether the risk signal to be assessed is periodic; if the risk signal to be assessed is periodic, then entering S302;

S302: determining the spectrum amplitude corresponding to the risk signal to be assessed;

S303: acquiring the current intensity of a radiation source and the distance between the risk signal to be assessed and the radiation source;

S304: calculating to obtain the radiation intensity of the risk signal to be assessed using the spectrum amplitude, the current intensity and the distance;

S305: acquiring a preset standard intensity and comparing to obtain a comparison result between the preset standard intensity and the radiation intensity;

S306: generating simulation results of an excitation waveform corresponding to the risk signal to be assessed based on an MATLAB tool;

S307: determining the radiation risk assessment result using the comparison result and the simulation result.

Figure 4:
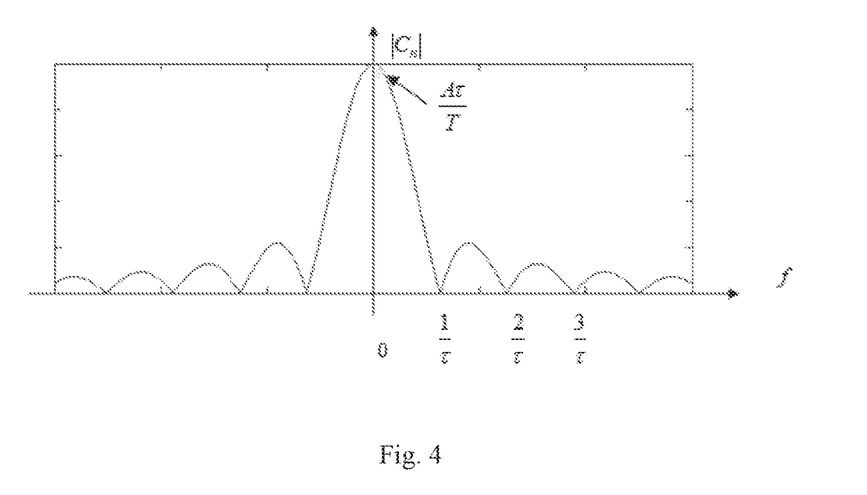
FIG. 4 is a schematic diagram of simulation results disclosed in the embodiment of the present application.
Figure 5:
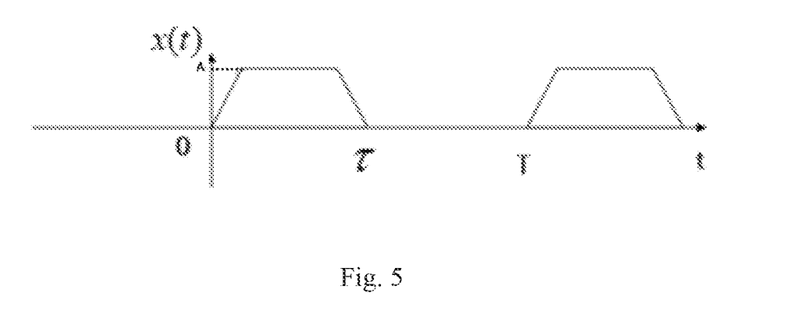
FIG. 5 is a periodic signal waveform diagram disclosed in the embodiment of the present application.
Figure 6:
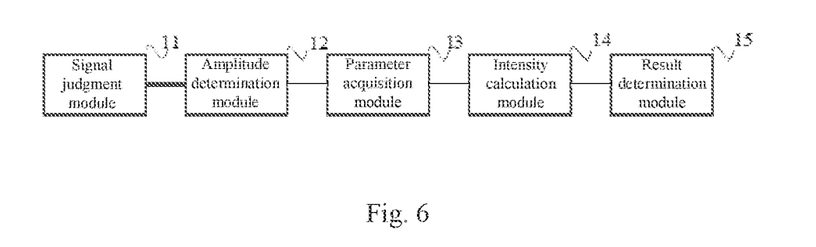
FIG. 6 is a structural diagram of a radiation risk assessment device disclosed in the embodiment of the present application.
Figure 7:
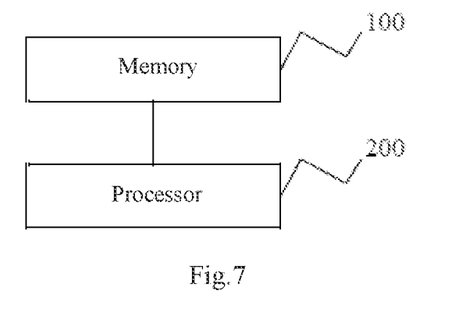
FIG. 7 is a structural diagram of an electronic device disclosed in the embodiment of the present application.
Figure 8:
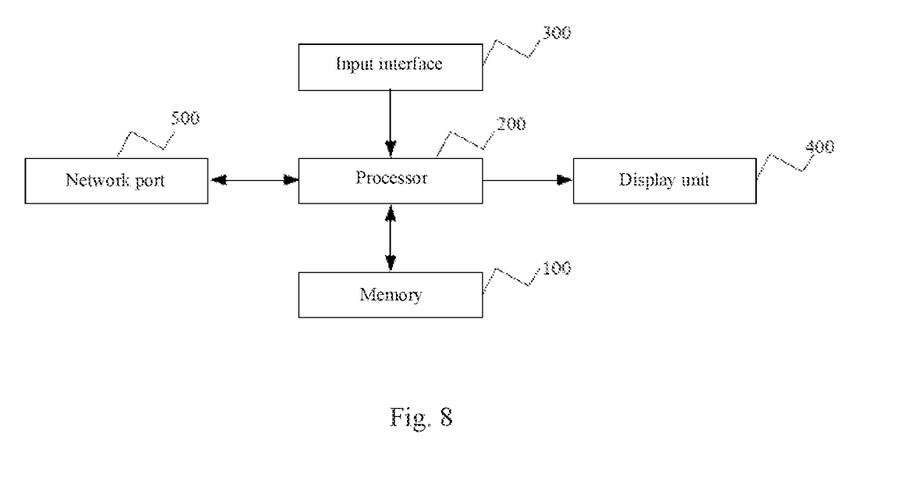
FIG. 8 is a structural diagram of another electronic device disclosed in the embodiment of the present application.

In the present embodiment, after acquiring the current radiation intensity of the risk signal to be assessed and comparing the current radiation intensity value with the preset radiation intensity value, the MATLAB tool is also used to generate simulation results of the corresponding excitation waveform of the risk signal to be assessed, as shown in FIG. 4. Further, the simulation results and comparison results are combined to obtain more accurate and detailed radiation risk assessment results. Specifically, the process of generating simulation results using the MATLAB tool can include: importing the second formula provided in the preceding embodiment and the signal duty cycle, signal period and signal frequency of the corresponding risk signal to be assessed into the MATLAB tool, to generate simulation results of the corresponding excitation waveform of the risk signal to be assessed.

The invention claimed is:

1. A radiation risk assessment method for designing of a product, comprising:

determining a risk signal to be assessed based on a product design model, and judging whether the risk signal to be assessed is periodic;

if the risk signal to be assessed is periodic, determining a spectrum amplitude corresponding to the risk signal to be assessed;

acquiring a current intensity of a radiation source and the distance between the risk signal to be assessed and the radiation source;

calculating to obtain the radiation intensity of the risk signal to be assessed using the spectrum amplitude, the current intensity and the distance;

determining the corresponding radiation risk assessment result according to the radiation intensity to ensure the design of the product is compliant before the production;

generating simulation results of an excitation waveform corresponding to the risk signal to be assessed based on a MATLAB tool;

correspondingly, the determining the corresponding radiation risk assessment result according to the radiation intensity comprises:

acquiring a preset standard intensity and comparing to obtain a comparison result between the preset standard intensity and the radiation intensity; and determining the radiation risk assessment result using the comparison result and the simulation result.

2. The radiation risk assessment method according to claim 1, wherein, the calculating to obtain the radiation intensity of the risk signal to be assessed using the spectrum amplitude, the current intensity and the distance comprises:

calculating to obtain the radiation intensity of the risk signal to be assessed using the spectrum amplitude, the current intensity and the distance based on a first formula; wherein the first formula is as follows:

$$S = 20 \log_{10} \frac{|C_n| * I}{R};$$

wherein S is the radiation intensity; $C_n$ is the spectral amplitude; I is the current intensity; and R is the distance.

3. The radiation risk assessment method according to claim 1, wherein, the determining the spectrum amplitude corresponding to the risk signal to be assessed comprises:

acquiring the signal duty cycle, the signal period and the signal frequency of the risk signal to be assessed;

determining the spectrum amplitude of the risk signal to be assessed using a second formula, the signal duty cycle, the signal period and the signal frequency; wherein the second formula is as follows:

$$|c_n| = \frac{A\tau}{T} \left| \frac{\sin(n\pi f \tau)}{n\pi f \tau} \right|$$

wherein $c_n$ is the spectrum amplitude; A is the voltage peak in the time domain of the risk signal; n is the number of harmonics; τ is the signal duty cycle; T is the signal period; and f is the signal frequency.

4. The radiation risk assessment method according to claim 3, wherein, the acquiring the signal duty cycle, the signal period and the signal frequency of the risk signal to be assessed comprises:
acquiring the signal duty cycle, the signal period and the signal frequency corresponding to the risk signal to be assessed by querying a preset parameter library.

5. The radiation risk assessment method according to claim 1, wherein, the determining the corresponding radiation risk assessment result according to the radiation intensity comprises:
acquiring the preset standard intensity and comparing to obtain the comparison result between the preset standard intensity and the radiation intensity; and
determining the corresponding radiation risk assessment result using the comparison result.

6. An electronic device, comprising:
a memory, configured to store a computer program; and
a processor, configured to implement a radiation risk assessment method for designing of a product, comprising:
determining a risk signal to be assessed based on a product design model, and judging whether the risk signal to be assessed is periodic;
if the risk signal to be assessed is periodic, determining a spectrum amplitude corresponding to the risk signal to be assessed;
acquiring a current intensity of a radiation source and the distance between the risk signal to be assessed and the radiation source;
calculating to obtain the radiation intensity of the risk signal to be assessed using the spectrum amplitude, the current intensity, and the distance; and
determining the corresponding radiation risk assessment result according to the radiation intensity to ensure the design of the product is compliant before the production;
generating simulation results of an excitation waveform corresponding to the risk signal to be assessed based on a MATLAB tool;
correspondingly, the determining the corresponding radiation risk assessment result according to the radiation intensity comprises:
acquiring a preset standard intensity and comparing to obtain a comparison result between the preset standard intensity and the radiation intensity; and
determining the radiation risk assessment result using the comparison result and the simulation result.

7. The radiation risk assessment method according to claim 6, wherein, the determining the corresponding radiation risk assessment result according to the radiation intensity comprises:
acquiring the preset standard intensity and comparing to obtain the comparison result between the preset standard intensity and the radiation intensity; and
determining the corresponding radiation risk assessment result using the comparison result.

8. The electronic device according to claim 6, wherein, the calculating to obtain the radiation intensity of the risk signal to be assessed using the spectrum amplitude, the current intensity and the distance comprises:
calculating to obtain the radiation intensity of the risk signal to be assessed using the spectrum amplitude, the current intensity and the distance based on a first formula; wherein the first formula is as follows:

$$S = 20\ \log_{10}\frac{|C_n|*I}{R};$$

wherein S is the radiation intensity; $C_n$ is the spectral amplitude; I is the current intensity; and R is the distance.

9. The radiation risk assessment method according to claim 6, wherein, the determining the spectrum amplitude corresponding to the risk signal to be assessed comprises:
acquiring the signal duty cycle, the signal period and the signal frequency of the risk signal to be assessed;
determining the spectrum amplitude of the risk signal to be assessed using a second formula, the signal duty cycle, the signal period and the signal frequency;
wherein the second formula is as follows:

$$|c_n| = \frac{A\tau}{T}\left|\frac{\sin(n\pi f\tau)}{n\pi f\tau}\right|$$

wherein $c_n$ is the spectrum amplitude; A is the voltage peak in the time domain of the risk signal; n is the number of harmonics; τ is the signal duty cycle; T is the signal period; and f is the signal frequency.

10. The radiation risk assessment method according to claim 9, wherein, the acquiring the signal duty cycle, the signal period and the signal frequency of the risk signal to be assessed comprises:
acquiring the signal duty cycle, the signal period and the signal frequency corresponding to the risk signal to be assessed by querying a preset parameter library.

11. A non-transitory computer readable storage medium, wherein, the non-transitory computer readable storage medium has a computer program stored thereon, and the computer program, when being executed by a processor, implements a radiation risk assessment method for designing of a product comprising:
determining a risk signal to be assessed based on a product design model, and judging whether the risk signal to be assessed is periodic;
if the risk signal to be assessed is periodic, determining a spectrum amplitude corresponding to the risk signal to be assessed;
acquiring a current intensity of a radiation source and the distance between the risk signal to be assessed and the radiation source;
calculating to obtain the radiation intensity of the risk signal to be assessed using the spectrum amplitude, the current intensity, and the distance;
determining the corresponding radiation risk assessment result according to the radiation intensity to ensure the design of the product is compliant before the production;
generating simulation results of an excitation waveform corresponding to the risk signal to be assessed based on a MATLAB tool;
correspondingly, the determining the corresponding radiation risk assessment result according to the radiation intensity comprises:
acquiring a preset standard intensity and comparing to obtain a comparison result between the preset standard intensity and the radiation intensity; and determining the radiation risk assessment result using the comparison result and the simulation result.

12. The radiation risk assessment method according to claim 11, wherein, the determining the corresponding radiation risk assessment result according to the radiation intensity comprises:
acquiring the preset standard intensity and comparing to obtain the comparison result between the preset standard intensity and the radiation intensity; and
determining the corresponding radiation risk assessment result using the comparison result.

* * * * *